United States Patent
He (10) Patent No.: US 10,152,129 B2
(45) Date of Patent: Dec. 11, 2018

(54) ELECTRONIC DEVICE, METHOD AND COMPUTER PROGRAM PRODUCT FOR PROVIDING VIBRATORY FEEDBACK

(71) Applicant: Lenovo (Beijing) Limited, Beijing (CN)

(72) Inventor: Jianlin He, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 58 days.

(21) Appl. No.: 15/369,604

(22) Filed: Dec. 5, 2016

(65) Prior Publication Data
US 2017/0160806 A1    Jun. 8, 2017

(51) Int. Cl.
| G06F 3/00 | (2006.01) |
| G06F 3/01 | (2006.01) |
| G06F 3/041 | (2006.01) |
| G06F 1/16 | (2006.01) |

(52) U.S. Cl.
CPC ............ G06F 3/016 (2013.01); G06F 1/1626 (2013.01); G06F 3/041 (2013.01); G06F 3/0412 (2013.01)

(58) Field of Classification Search
CPC ........ G06F 3/016; G06F 3/0412; G06F 3/041; G06F 1/1626
See application file for complete search history.

(56) References Cited

U.S. PATENT DOCUMENTS

| 2010/0238116 A1* | 9/2010 | Shin | G06F 3/016 345/168 |
| 2010/0328053 A1* | 12/2010 | Yeh | G06F 3/016 340/407.2 |
| 2011/0037707 A1* | 2/2011 | Radivojevic | G06F 3/016 345/173 |
| 2012/0081337 A1* | 4/2012 | Camp, Jr. | G06F 3/0436 345/177 |
| 2014/0176455 A1* | 6/2014 | Araki | G06F 3/016 345/173 |
| 2015/0277610 A1* | 10/2015 | Kim | G06F 3/016 345/173 |

* cited by examiner

Primary Examiner — Muhammad N Edun
(74) Attorney, Agent, or Firm — Kunzler, PC (57) ABSTRACT

An electronic device, method, and computer program product are disclosed. The electronic device includes a processor and an input device. The input device includes motors and a touch device. In response to a touch input, at least one of the motors generates vibratory feedback. The method includes detecting a touch input, determining a distance between the location of the touch input and at least one motor, and generating a vibratory feedback proportionate to the distance between the location of the touch input and the at least one motor. The computer program product includes executable code to perform detecting a touch input, determining a distance between the location of the touch input and at least one motor, and generating a vibratory feedback proportionate to the distance between the location of the touch input and the at least one motor.

17 Claims, 4 Drawing Sheets

ELECTRONIC DEVICE, METHOD AND COMPUTER PROGRAM PRODUCT FOR PROVIDING VIBRATORY FEEDBACK

CROSS-REFERENCE TO RELATED APPLICATIONS

This patent application claims priority to People's Republic of China Patent Application No. 201510885847.7 filed on 4 Dec. 2015 for Jianlin He, the entire contents of which are incorporated herein by reference for all purposes.

FIELD

The subject matter disclosed herein relates to control technologies, and in particular, to an electronic device and a control method.

BACKGROUND

As screens of electronic devices become larger, the electronic devices themselves become heavier. Conventional electronic devices have only one underpowered vibration component, providing the user with only a weak vibration sensation, if any. Weak or non-existent vibration caused by the increased weight of electronic devices has become an urgent problem.

SUMMARY

One embodiment of the present disclosure includes an electronic device. The electronic device includes a processor and an input device, and the input device includes a plurality of motors and a touch device coupled to the plurality of motors. The input device is coupled to the processor. In response to a touch input to the touch device, at least one of the motors of the plurality of motors operates to generate vibratory feedback proportional to a distance from a touch point to at least one of the motors.

One embodiment of the present disclosure includes a method. The method includes detecting a touch input made to an electronic device. The method includes determining a distance between a location of the touch input and at least one motor of a plurality of motors. The method includes generating vibratory feedback proportional to the determined distance between the corresponding distance between the location of the touch input and each of the at least one motors of the plurality of motors.

One embodiment of the present disclosure includes a computer program product. The computer program product includes executable code to detect a touch input made to an input device of an electronic device. The computer program product includes executable code to determine a distance between a location of the touch input and at least one motor of a plurality of motors of the input device. The computer program product includes executable code to generate a vibratory feedback via at least one motor of the plurality of motors proportional to the distance between the location of the touch input and each of the at least one motors of the plurality of motors.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

In order to make the features and technical contents of the embodiments more comprehensible, the implementation of the embodiments is described in detail below with reference to the accompanying drawings, and the accompanying drawings are provided for reference and illustration only and are not intended to limit the scope of the embodiments.

Various embodiments are described in further detail below with reference to the accompanying drawings and specific embodiments. The scope of the disclosure is not limited to the specific embodiments discussed herein.

Embodiment 1

Figure 1:
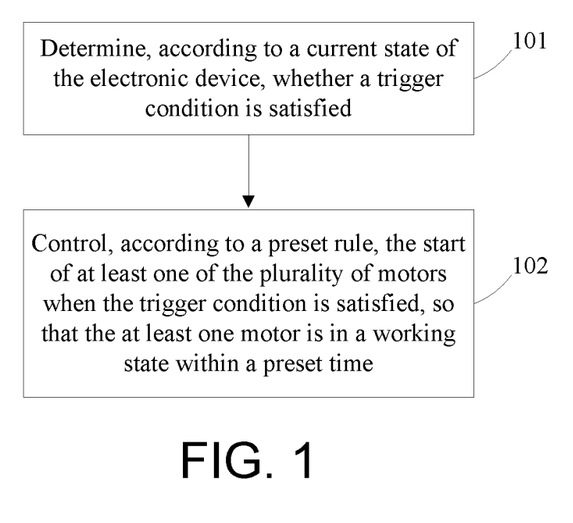
FIG. 1 is a first schematic flow diagram illustrating implementation of a control method of one embodiment.

FIG. 1 is a first schematic flow diagram illustrating one implementation of a control method. The control method is applied to an electronic device, which may be a terminal having a touch screen, such as a mobile phone, a tablet computer, a smart TV, or other device having a touch screen.

The electronic device comprises a plurality of motors, and the motors of the plurality of motors are distributed inside the electronic device. Vibration areas corresponding to the plurality of motors cover an entire screen area of the electronic device. In one embodiment, the control method comprises the following Step 101 and Step 102.

Step 101: Determine, according to a current state of the electronic device, whether a trigger condition is satisfied. Preferably, this step additionally comprises: determining whether a receiver of the electronic device receives a touch input; and if yes, determining that the trigger condition is satisfied.

Step 102: Control, according to a preset rule, the start of at least one of the plurality of motors when the trigger condition is satisfied, so that the at least one motor is in a working state within a preset time.

Figure 2:
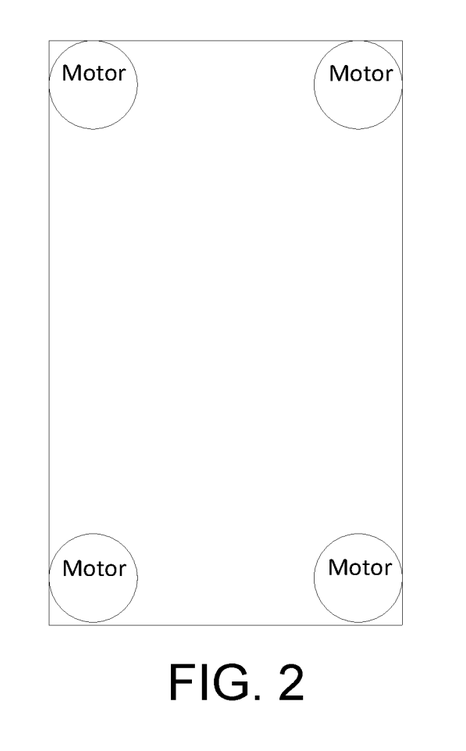
FIG. 2 is a schematic diagram illustrating distribution of motors in an electronic device of one embodiment.

FIG. 2 is a schematic diagram illustrating one embodiment's distribution of motors in the electronic device, wherein the motors are evenly distributed inside the electronic device. In embodiments comprising an electronic device of substantially rectangular shape, it is preferable that the four motors be distributed on four corners of the electronic device.

Each motor corresponds to an independent control circuit and to a vibration area. Each motor is located at a first position of the motor's corresponding vibration area. In each vibration area, vibration intensity of the motor is in direct proportion to a distance from a touch point to the motor.

Figure 3:
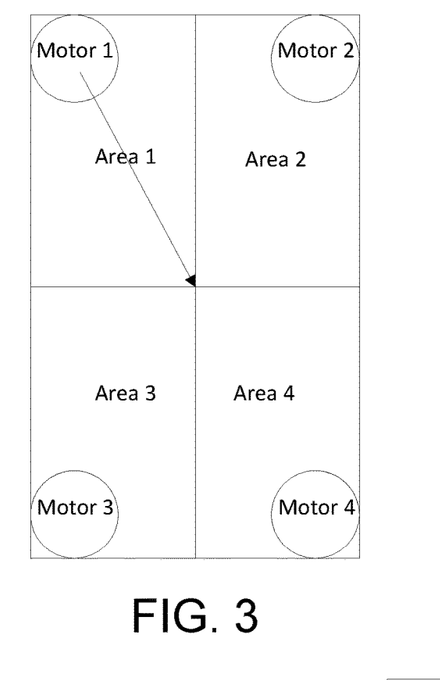
FIG. 3 is a schematic diagram of vibration areas corresponding to motors when the motors separately vibrate of one embodiment.

FIG. 3 is a schematic diagram of one embodiment of the current subject matter wherein vibration areas corresponding to motors when the motors separately vibrate. In FIG. 3, a total of four motors, namely, a motor 1, a motor 2, a motor 3, and a motor 4, are distributed in the electronic device. Each of the four motors respectively correspond to four areas of a touch screen; that is, the motor 1 corresponds to a vibration area 1, the motor 2 corresponds to a vibration area 2, the motor 3 corresponds to a vibration area 3, and the motor 4 corresponds to a vibration area 4. Each motor is located at a first position of the vibration area corresponding to the motor, and in the vibration area, vibration intensity of the motor is in direct proportion to a distance from a touch point to the motor.

The "Control, according to a preset rule, the start of at least one of the plurality of motors" portion of Step 102 comprises: acquiring state parameters collected by a sensor; determining vibration intensity based on the state parameters; determining control of the start of the plurality of motors when the vibration intensity meets or exceeds a first threshold; and determining control of the start of a portion of the plurality of motors when the vibration intensity does not exceed the first threshold. In this way, by controlling start of one or more motors, it is ensured that a user can desirably sense vibration of the electronic device when a touch input is performed.

When the vibration intensity does not exceed the first threshold, the "determining control of the start of a portion of the plurality of motors" preferably includes: acquiring a power value of each of the motors of the plurality of motors; and determining to-be-started motors according to the vibration intensity and the power value of each motor.

The "determining control of the start of the plurality of motors" and the "determining control of the start of a portion of the plurality of motors" preferably include: determining whether the plurality of motors or a portion of the plurality of motors satisfy a synchronous vibration condition; controlling the plurality of motors or a portion of the plurality of motors to synchronously vibrate if the synchronous vibration condition is satisfied; and controlling the plurality of motors or a portion of the plurality of motors to separately vibrate if the synchronous vibration condition is not satisfied.

This embodiment determines, according to a current state of the electronic device, whether a trigger condition is satisfied; and when the trigger condition is satisfied, the start of at least one of the plurality of motors is controlled according to a preset rule, so that the at least one motor is in a working state within a preset time. In this way, the problem of weak or no vibration caused by the heavy weight of the electronic device can be solved, thereby improving user experience.

Embodiment 2

Figure 4:
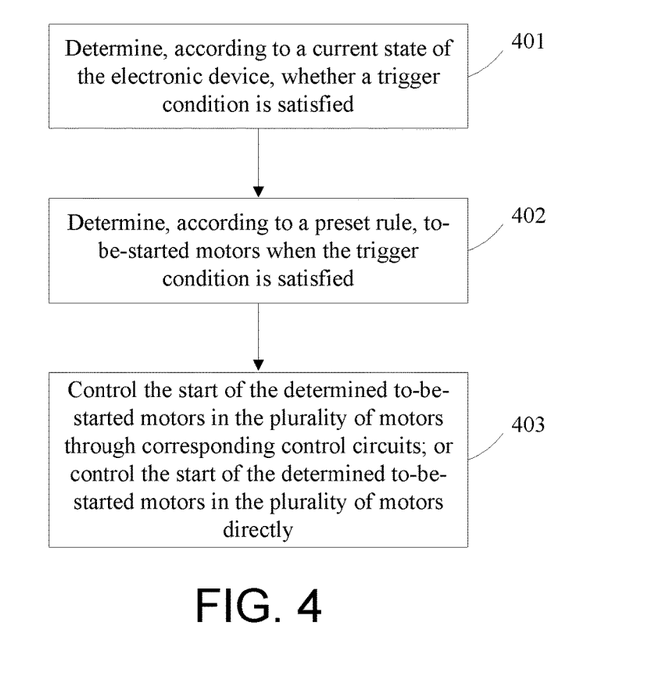
FIG. 4 is a second schematic flow diagram illustrating implementation of the control method of one embodiment.

FIG. 4 is a second schematic flow diagram illustrating implementation of a one embodiment of a control method. The control method is applied to an electronic device comprising a plurality of motors, and the motors of the plurality of motors are evenly distributed inside the electronic device.

In a preferred embodiment, the control method comprises the following Step 401, Step 402 and Step 403.

Step 401: Determine, according to a current state of the electronic device, whether a trigger condition is satisfied. Preferably, the "determine, according to a current state of the electronic device, whether a trigger condition is satisfied" includes: determining whether a receiver of the electronic device receives a touch input; and if yes, determining that the trigger condition is satisfied.

Step 402: Determine, according to a preset rule, to-be-started motors when the trigger condition is satisfied.

In such an embodiment, it is preferable that the vibration areas corresponding to the plurality of motors cover an entire screen area of the electronic device. It is also preferred that each motor correspond to an independent control circuit, and that each motor correspond to a different vibration area. In such an arrangement, each motor is located at a first position of the vibration area corresponding to the motor, and the vibration intensity of the motor in its corresponding vibration area is in direct proportion to a distance from a touch point to the motor.

Preferably, the "Determine, according to a preset rule, to-be-started motors" additionally comprises: acquiring state parameters collected by a sensor; determining vibration intensity based on the state parameters; determining control of the start of the plurality of motors when the vibration intensity meets or exceeds a first threshold; and determining control of the start of a portion of the plurality of motors when the vibration intensity does not exceed the first threshold.

Preferably, when the vibration intensity does not exceed the first threshold, the "determining control of the start of a portion of the plurality of motors" additionally comprises: acquiring a power value of each of the motors of the plurality of motors; and determining to-be-started motors according to the vibration intensity and the power value of each motor.

Preferably, the "determining control of the start of the plurality of motors" and "determining control of the start of a portion of the plurality of motors" additionally comprise: determining whether the plurality of motors or a portion of the plurality of motors satisfy a synchronous vibration condition; controlling the plurality of motors or a portion of the plurality of motors to synchronously vibrate if the synchronous vibration condition is satisfied; and controlling the plurality of motors or a portion of the plurality of motors to separately vibrate if the synchronous vibration condition is not satisfied.

Step 403: Control the start of the determined to-be-started motors in the plurality of motors through corresponding control circuits; or control the start of the determined to-be-started motors in the plurality of motors directly.

Figure 5:
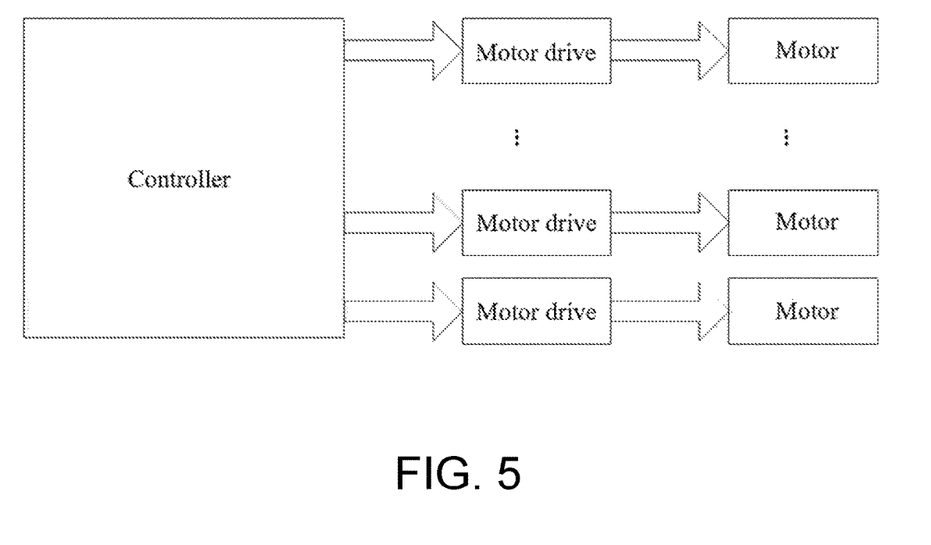
FIG. 5 is a schematic diagram illustrating control of motors through corresponding control circuits of one embodiment.

FIG. 5 is a schematic diagram illustrating one embodiment of control of motors through corresponding control circuits. It can be seen from FIG. 5 that each motor corresponds to an independent control circuit, and a controller may control the plurality of motors or a portion of the plurality of motors through corresponding control circuits.

It should be noted that the motor shown in FIG. 5 is a motor requiring a driving chip, such as a linear motor or a ceramic motor.

Figure 6:
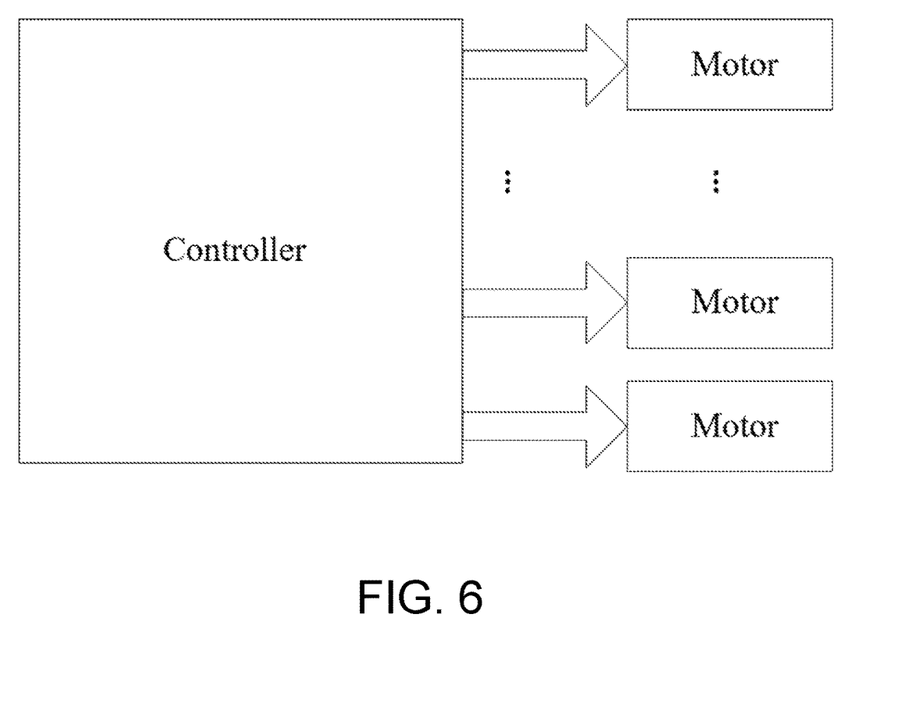
FIG. 6 is a schematic diagram illustrating direct control of motors of one embodiment.

Correspondingly, FIG. 6 is a schematic diagram illustrating one embodiment of direct control of motors. Compared with FIG. 5, the motor shown in FIG. 6 is a common motor that does not need to be controlled by a motor drive and can be controlled by a controller directly.

In this embodiment, it is determined, according to a current state of the electronic device, whether a trigger condition is satisfied; when the trigger condition is satisfied, to-be-started motors are determined according to a preset rule; and start of the determined to-be-started motors in the plurality of motors is controlled through corresponding control circuits; or start of the determined to-be-started motors in the plurality of motors is controlled directly. In this way, the problem of coordination between multiple motors can be solved, thereby improving user experience.

Embodiment 3

Figure 7:
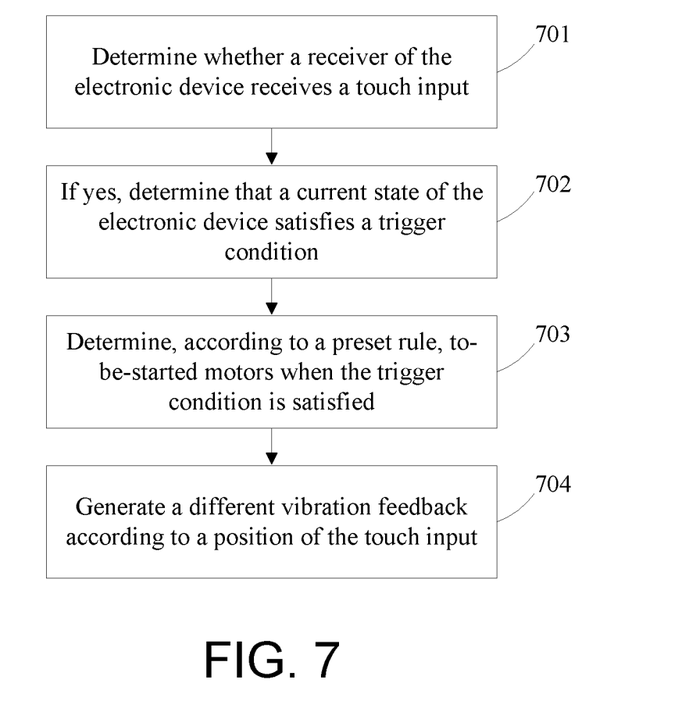
FIG. 7 is a third schematic flow diagram illustrating implementation of the control method of one embodiment.

FIG. 7 is a third schematic flow diagram illustrating one embodiment of an implementation of a control method. The control method is applied to an electronic device comprising a plurality of motors, and the motors of the plurality of motors are evenly distributed inside the electronic device. In a preferred embodiment, the control method comprises the following Step 701, Step 702, Step 703 and Step 704.

Step 701: Determine whether a receiver of the electronic device receives a touch input. The touch input may be a keyboard input (type 1 input) or it may be a trajectory input (type 2 input).

Step 702: If yes, determine that a current state of the electronic device satisfies a trigger condition.

Step 703: Determine, according to a preset rule, to-be-started motors when the trigger condition is satisfied.

In such an embodiment, it is preferable that the vibration areas corresponding to the plurality of motors cover an entire screen area of the electronic device. It is also preferred that each motor correspond to an independent control circuit, and that each motor correspond to a different vibration area. In such an arrangement, each motor is located at a first position of the vibration area corresponding to the motor, and the vibration intensity of the motor in its corresponding vibration area is in direct proportion to a distance from a touch point to the motor.

Preferably, the "Determine, according to a preset rule, to-be-started motors" additionally comprises: selecting a control policy according to a type of the touch input; and generating a vibration feedback adapted to the type of the touch input according to the corresponding control policy. Touch input types include, but are not limited to, a type 1 input comprising a keyboard input and a type 2 input comprising a trajectory input.

Preferably, the "selecting a different control policy according to a type of the touch input" includes: selecting a first control policy when the type of the touch input is the type 1 input.

The "selecting a first control policy when the type of the touch input is the type 1 input" includes: acquiring a touch point position of the touch input; acquiring a distance between the touch point position and each of the motors of the plurality of motors; and selecting at least one of the motors of the plurality of motors to start based on the power value and vibration intensity of each motor for the touch point position during start of the motor, so that a sum of the vibration intensities of the started motors at the touch point position is equal to a first preset vibration intensity value, wherein the first preset vibration intensity value is a fixed value.

The "selecting a different control policy according to a type of the touch input" further includes: selecting a second control policy when the type of the touch input is the type 2 input.

The "selecting a second control policy when the type of the touch input is the type 2 input" includes: acquiring a touch point position of the touch input; determining a second preset vibration intensity value corresponding to a pressure value of the touch input; acquiring a distance between the touch point position and each of the motors of the plurality of motors; and selecting at least one of the motors of the plurality of motors to start based on the power value of each motor and vibration intensity of each motor for the touch point position during the start of the motor, so that a sum of vibration intensity of the started motors at the touch point position is equal to the second preset vibration intensity value.

Step 704: Generate a different vibration feedback according to a position of the touch input.

When the touch input is a type 1 input, the vibration feedback generated in response to the type 1 input comprises: causing a user to experience a consistent vibration feedback when the user presses any key. In this way, when performing input on a virtual keyboard, the user can experience the same input feedback as on a physical keyboard, thereby improving user experience.

When the touch input is a type 2 input, the vibration feedback generated in response to the type 2 input comprises an inconsistent vibration feedback during input that is related to the force of the user input. In other words, the larger the force of the user input is, the stronger the vibration feedback is. For example, a vibration feedback generated when the user performs input with a stylus on the touch screen will be different from a vibration feedback generated when the user performs input with a finger on the touch screen. In this way, different types of vibration feedback can be generated according to the forces of different user inputs, thereby improving the user's experience.

In this embodiment, it is determined whether a receiver of the electronic device receives a touch input. If yes, it is determined that a current state of the electronic device satisfies a trigger condition. After the trigger condition is satisfied, to-be-started motors are selected according to a preset rule, and a different vibration feedback is generated according to a position of the touch input. In this way, the problem of weak or non-existent vibration caused by the heavy weight of the electronic device can be solved. Furthermore, the problem of coordination between multiple motors can be solved, and different types of vibration feedback are generated for different touch inputs, thereby greatly improving user experience.

Embodiment 4

Figure 8:
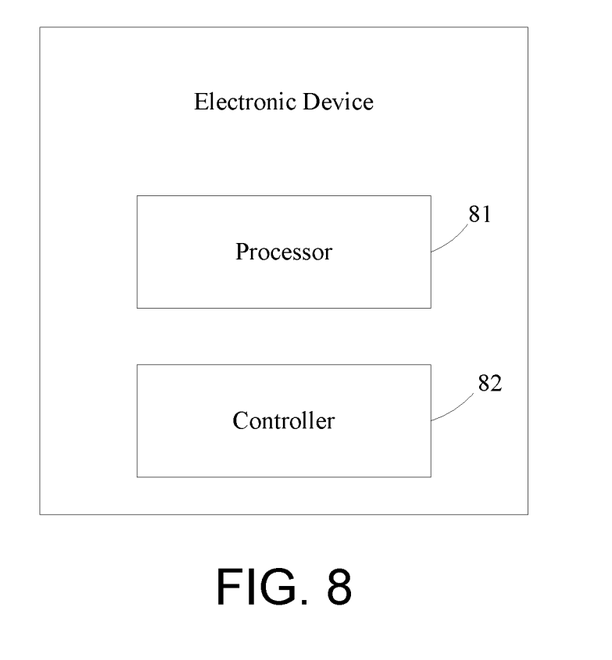
FIG. 8 is a schematic structural diagram of the electronic device of one embodiment.

FIG. 8 is a schematic structural diagram of an electronic device in one embodiment of the present subject matter. The electronic device comprises a plurality of motors, and the motors of the plurality of motors are evenly distributed inside the electronic device. In the preferred embodiment, each motor corresponds to an independent control circuit and a different vibration area. The vibration areas corresponding to the plurality of motors cover an entire screen area of the electronic device, and each motor is located at a first position of the vibration area corresponding to the motor. The vibration intensity of each motor in its corresponding vibration area is in direct proportion to a distance from a touch point to the motor.

As shown in FIG. 8, the electronic device further includes: a processor 81 configured to determine, according to a current state of the electronic device, whether a trigger condition is satisfied; and a controller 82 configured to control, according to a preset rule, the start of at least one of the N motors when the trigger condition is satisfied, so that the at least one motor is in a working state within a preset time.

In preferred embodiments, the processor 81 is further configured to: determine whether a receiver of the electronic device receives a touch input; and if yes, determine that the trigger condition is satisfied.

In preferred embodiments, the controller 82 is specifically configured to: acquire state parameters collected by a sensor; determine a vibration intensity based on the state parameters; determine the control of the start of the plurality of motors when the vibration intensity meets or exceeds a first threshold; and determine the control of the start of a portion of the plurality of motors when the vibration intensity does not exceed the first threshold.

In some embodiments, the controller 82 is further configured to: if the vibration intensity does not exceed the first threshold, acquire a power value of each of the plurality of motors; and determine to-be-started motors according to the vibration intensity and the power value of each motor.

In some embodiments, the controller 82 is further configured to: determine whether the plurality of motors or a portion of the plurality of motors satisfy a synchronous vibration condition; control the plurality of motors or a portion of the plurality of motors to synchronously vibrate if the synchronous vibration condition is satisfied; and control the plurality of motors or a portion of the plurality of motors to separately vibrate if the synchronous vibration condition is not satisfied.

Those skilled in the art should understand that functions of the components in the electronic device may be understood with reference to the relevant description of the foregoing control method. The components in the electronic device in this embodiment may be implemented through a circuit that implements the function of this embodiment, or may be implemented through software run on an intelligent terminal that executes the function of this embodiment.

Embodiment 5

This embodiment provides an electronic device. The electronic device comprises a plurality of motors, and the motors of the plurality of motors are evenly distributed inside the electronic device. Each motor corresponds to an independent control circuit and a different vibration area. The vibration areas corresponding to the plurality of motors cover an entire screen area of the electronic device, and each motor is located at a first position of the vibration area corresponding to the motor. The vibration intensity of each motor in its corresponding vibration area is in direct proportion to a distance from a touch point to the motor.

The electronic device further includes a processor 81, configured to determine, according to a current state of the electronic device, whether a trigger condition is satisfied; and when the trigger condition is satisfied, determine to-be-started motors according to a preset rule.

The electronic device further includes a controller 82, configured to control the start of the to-be-started motors in the plurality of motors through corresponding control circuits. Alternatively, the controller 82 directly controls the start of the to-be-started motors in the plurality of motors.

The controller 82 is further configured to: acquire state parameters collected by a sensor; determine vibration intensity based on the state parameters; determine the control of the start of the plurality of motors when the vibration intensity exceeds a first threshold; and determine the control of the start of a portion of the plurality of motors when the vibration intensity does not exceed the first threshold.

The controller 82 is further configured to: if the vibration intensity does not exceed the first threshold, acquire a power value of each of the motors of the plurality of motors if the vibration intensity and determine to-be-started motors according to the vibration intensity and the power value of each motor.

The controller 82 is further configured to: determine whether the plurality of motors or a portion of the plurality of motors satisfy a synchronous vibration condition; control the plurality of motors or portion of the plurality of motors to synchronously vibrate if the synchronous vibration condition is satisfied; and control the plurality of motors or portion of the plurality of motors to separately vibrate if the synchronous vibration condition is not satisfied.

Those skilled in the art should understand that functions of the components in the electronic device may be understood with reference to the relevant description of the foregoing control method. The components in the electronic device in this embodiment may be implemented through a circuit that implements the function of this embodiment, or may be implemented through software run on an intelligent terminal that executes the function of this embodiment.

Embodiment 6

This embodiment provides an electronic device. The electronic device comprises a plurality of motors, and the motors of the plurality of motors are evenly distributed inside the electronic device. Each motor corresponds to an independent control circuit and a different vibration area. The vibration areas corresponding to the motors of the plurality of motors cover an entire screen area of the electronic device, and each motor is located at a first position of the vibration area corresponding to the motor. The vibration intensity of each motor in its corresponding vibration area is in direct proportion to a distance from a touch point to the motor.

The electronic device further includes: a processor 81, configured to determine whether a receiver of the electronic device receives a touch input. If so, the processor 81 determines that a current state of the electronic device satisfies a trigger condition; and after the trigger condition is satisfied, the processor 81 determines to-be-started motors according to a preset rule.

The electronic device further includes a controller 82, configured to generate different types of vibration feedback according to a position of the touch input.

Preferably, the controller 82 is further configured to: select a control policy according to a type of the touch input; and generate a vibration feedback adapted to the type of the touch input according to the corresponding control policy, wherein the touch input types include a type 1 input comprising a keyboard input and a type 2 input comprising a trajectory input.

Preferably, the controller 82 is additionally configured to select a first control policy when the touch input is the type 1 input, wherein the first control policy comprises: acquiring a touch point position of the touch input; acquiring a distance between the touch point position and each of the motors of the plurality of motors; and selecting at least one of the motors of the plurality of motors to start based on the power value and vibration intensity of each motor for the touch point position during the start of the motor, so that a sum of vibration intensities of the started motors at the touch point position is equal to a first preset vibration intensity value, where the first preset vibration intensity value is a fixed value.

Preferably, the controller 82 is additionally configured to select a second control policy when the type of the touch input is the type 2 input, wherein the second control policy includes: acquiring a touch point position of the touch input; acquiring a pressure value of the touch input; determining a second preset vibration intensity value corresponding to the pressure value; acquiring a distance between the touch point position and each of the motors of the plurality of motors; and selecting at least one of the motors of the plurality of motors to start based on the power value and vibration intensity of each motor for the touch point position during start of the motor, so that a sum of vibration intensities of the started motors at the touch point position is equal to the second preset vibration intensity value.

In other words, the touch input types include a type 1 input comprising a keyboard input. When the touch input is of the type 1 input, a vibration feedback generated in response to the type 1 input comprises a consistent vibration feedback experienced by the user when the user presses any key. The touch input types further include a type 2 input on the tablet as a trajectory input, and when the touch input is of the type 2 input, a vibration feedback generated in response to the type 2 input comprises an inconsistent vibration feedback received by the user that is related to the force of the user input received by the user during input.

Those skilled in the art should understand that functions of the components in the electronic device in this embodiment may be understood with reference to the relevant description of the foregoing control method. The components in the electronic device in this embodiment may be implemented through a circuit that implements the function of this embodiment, or may be implemented through software run on an intelligent terminal that executes the function of this embodiment.

In the several embodiments disclosed herein, it should be understood that the disclosed method, electronic device and computer program product may be implemented in other manners. The device embodiments described above are merely exemplary. For example, the division of units is merely a logical function division and the division may differ in actual implementation. Also, multiple units or components may be combined or integrated into another system, or some features may be ignored or not performed. In addition, the displayed or discussed mutual couplings or direct couplings or communication connections between the constituent parts may be implemented through interfaces. The indirect couplings or communication connections between the devices or units may be implemented in electrical, mechanical, or other forms.

The units described as separate parts may or may not be physically separated. The parts displayed as units may or may not be physical units, that is, may be located at one place or distributed on multiple network units. Some or all of the units may be selected to achieve the objective of the solution of the embodiment according to actual demands.

In addition, the functional units in the various embodiments may be integrated into one processing unit or each of the units may be used alone as a unit, or two or more units may be integrated into one unit. The integrated unit may be implemented in the form of hardware or implemented in the form of hardware plus a software functional unit.

Those of ordinary skill in the art will understand that all or some of the steps for implementing the method embodiments may be implemented by a program instructing relevant hardware. The program may be stored in a computer readable storage medium. When the program is running, the steps of the method embodiments are performed. The storage medium includes any medium that is capable of storing program codes, such as a mobile storage device, a read-only memory (ROM), a random-access memory (RAM), a magnetic disk, an optical disc or other storage medium.

Alternatively, when being implemented in the form of a software functional unit and sold or used as a separate product, the integrated unit in the various embodiments may also be stored in a computer readable storage medium. Based on such understanding, the essence of the technical solution(s) of the embodiments or the part that makes contributions to the prior art may be embodied in the form of a software product. The computer software product is stored in a storage medium and includes several instructions for instructing a computer device (which may be a personal computer, a server, a network device, or the like) to perform all or part of the method described in the embodiments. The storage medium includes any medium that is capable of storing program codes, such as a mobile storage device, a ROM, a RAM, a magnetic disk, an optical disc or other storage medium.

The above descriptions are merely specific manners of implementation, and the scope of protection of the various embodiments is not limited thereto. Variations or replacements within the technical scope of the present disclosure that are readily apparent to those skilled in the art shall fall within the scope of the present subject matter.

What is claimed is:

1. An electronic device, comprising:
    a processor;
    an input device, comprising a plurality of motors and a touch device coupled to the plurality of motors; and
    a controller;
    wherein
        the input device provides user input to the processor,
        the input device is coupled to the processor,
        in response to a touch input to the touch device, at least one motor of the plurality of motors is operative to generate vibratory feedback of a vibration intensity that is in direct proportion to a distance from a touch point to the at least one motor of the plurality of motors, and
        the controller
            acquires state parameters collected by a sensor,
            determines the vibration intensity based on the state parameters,
            if the vibration intensity meets or exceeds a first threshold, determines that to-be-started motors comprise the plurality of motors, and
            if the vibration intensity does not exceed the first threshold, acquires a power value of each of the motors of the plurality of motors, and determines that to-be-started motors comprise a portion of the plurality of motors according to an individual vibration intensity of each motor and the power value of each motor.

2. The electronic device of claim 1, wherein:
    the electronic device further comprises a display device coupled to the processor and the input device, and
    the display device displays the user input that is provided via the input device.

3. The electronic device of claim 1, wherein:
    each motor corresponds to an independent control circuit;
    each motor corresponds to a vibration area;
    the vibration areas cover the entire area of the input device;
    each motor is located at a first position of the motor's corresponding vibration area; and
    the individual vibration intensity of each motor in its corresponding vibration area is in direct proportion to a distance from a touch point to the motor.

4. The electronic device of claim 1, wherein the processor additionally:
    determines whether a receiver of the electronic device receives a touch input; and
    if yes, determines that a trigger condition is satisfied.

5. The electronic device of claim 4, wherein the controller:
    determines whether the to-be-started motors satisfy a synchronous vibration condition;

controls the to-be-started motors to synchronously vibrate if the synchronous vibration condition is satisfied; and
controls the to-be-started motors to separately vibrate if the synchronous vibration condition is not satisfied.

6. The electronic device of claim 4, wherein:
the controller controls the to-be-started motors through corresponding control circuits.

7. The electronic device of claim 4, wherein the controller further:
selects a control policy according to a type of the touch input; and
generates a vibration feedback adapted to the type of the touch input according to the corresponding control policy.

8. The electronic device according to claim 7, wherein the controller additionally:
selects a first control policy if the type of the touch input is a type 1 input; and
selects a second control policy if the type of the touch input is a type 2 input;
wherein the first control policy comprises:
acquiring a touch point position of the touch input,
acquiring a distance between the touch point position and each of the motors of the plurality of motors, and
selecting at least one of the motors of the plurality of motors to start based on the power value of each motor and the individual vibration intensity of each motor for the touch point position during the start of the motor, so that a sum of vibration intensities of the started motors at the touch point position is equal to a first preset vibration intensity value, wherein the first preset vibration intensity value is a fixed value; and
wherein the second control policy comprises:
acquiring a touch point position of the touch input,
acquiring a pressure value of the touch input,
determining a second preset vibration intensity value corresponding to the pressure value,
acquiring a distance between the touch point position and each of the motors of the plurality of motors, and
selecting at least one of the motors of the plurality of motors to start based on the power value of each motor and the individual vibration intensity of each motor for the touch point position during the start of the motor, so that a sum of vibration intensities of the started motors at the touch point position is equal to the second preset vibration intensity value.

9. A method, comprising:
detecting a touch input made to an input device of an electronic device;
determining a distance between a location of the touch input and at least one motor of a plurality of motors of the input device;
generating a vibratory feedback via the at least one motor of the plurality of motors, the vibratory feedback having a vibration intensity that is proportionate to the corresponding distance between the location of the touch input and each of the at least one motors of the plurality of motors; and
controlling the start of at least one of the motors of the plurality of motors according to a preset rule, which comprises:
acquiring state parameters collected by a sensor,
determining the vibration intensity based on the state parameters,
if the vibration intensity meets or exceeds a first threshold, determining that to-be-started motors comprise the plurality of motors, and
if the vibration intensity does not exceed the first threshold, acquiring the power value of each of the motors of the plurality of motors and determining that to-be-started motors comprise a portion of the plurality of motors according to an individual vibration intensity of each motor and the power value of each motor.

10. The method of claim 9, further comprising:
displaying the touch input via a display device of the electronic device.

11. The method of claim 9, wherein:
each motor corresponds to an independent control circuit;
each motor corresponds to a vibration area;
the vibration areas cover the entire area of the input device;
each motor is located at a first position of the motor's corresponding vibration area; and
the individual vibration intensity of each motor in its corresponding vibration area is in direct proportion to a distance from a touch point to the motor.

12. The method according to claim 9, further comprising:
determining whether a receiver of the electronic device receives a touch input; and
if the electronic device receives a touch input, determining that a trigger condition is satisfied.

13. The method according to claim 12, wherein controlling the start of at least one of the motors of the plurality of motors additionally comprises:
determining whether the at least one of the motors of the plurality of motors satisfies a synchronous vibration condition;
controlling the to-be-started motors to synchronously vibrate if the synchronous vibration condition is satisfied; and
controlling the to-be-started motors to separately vibrate if the synchronous vibration condition is not satisfied.

14. The method according to claim 12, wherein the method further comprises:
controlling the to-be-started motors through corresponding control circuits.

15. The method according to claim 12, wherein the method further comprises:
controlling the to-be-started motors directly.

16. The method of claim 12, further comprising:
selecting a control policy according to a type of the touch input; and
generating a vibration feedback adapted to the type of the touch input according to the corresponding control policy.

17. The method of claim 16, wherein selecting a control policy according to a type of the touch input comprises:
selecting a first control policy if the type of the touch input is a type 1 input; and
selecting a second control policy if the type of the touch input is a type 2 input;
wherein the first control policy comprises:
acquiring a touch point position of the touch input,
acquiring a distance between the touch point position and each of the motors of the plurality of motors, and
selecting at least one of the motors of the plurality of motors to start based on the power value of each motor and the vibration intensity of each motor for the touch point position during the start of the motor, so that a sum of vibration intensities of the started motors at the touch point position is equal to a first preset vibration intensity value, wherein the first preset vibration intensity value is a fixed value; and wherein the second control policy comprises:
acquiring a touch point position of the touch input,
acquiring a pressure value of the touch input,
determining a second preset vibration intensity value corresponding to the pressure value,
acquiring a distance between the touch point position and each of the motors of the plurality of motors, and
selecting at least one of the motors of the plurality of motors to start based on the power value of each motor and the vibration intensity of each motor for the touch point position during the start of the motor, so that a sum of vibration intensities of the started motors at the touch point position is equal to the second preset vibration intensity value.

* * * * *

UNITED STATES PATENT AND TRADEMARK OFFICE
CERTIFICATE OF CORRECTION

PATENT NO. : 10,152,129 B2
APPLICATION NO. : 15/369604
DATED : December 11, 2018
INVENTOR(S) : Jianlin He Page 1 of 1

It is certified that error appears in the above-identified patent and that said Letters Patent is hereby corrected as shown below:

On the Title Page

Column 1, Insert Item (30):
--(30) Foreign Application Priority Data
Dec. 04, 2015   (CN)..................... 2015 1 08858477--

Signed and Sealed this
Fourteenth Day of July, 2020

Andrei Iancu
*Director of the United States Patent and Trademark Office*